(12) United States Patent  
Yoshida

(10) Patent No.: US 9,908,960 B2  
(45) Date of Patent: Mar. 6, 2018

(54) STAR-SHAPED VINYL ETHER POLYMER

(71) Applicant: MARUZEN PETROCHEMICAL CO., LTD., Chuo-ku (JP)

(72) Inventor: Norihiro Yoshida, Chiba (JP)

(73) Assignee: MARUZEN PETROCHEMICAL CO., LTD., Chuo-ku (JP)

( * ) Notice: Subject to any disclaimer, the term of this patent is extended or adjusted under 35 U.S.C. 154(b) by 85 days.

(21) Appl. No.: 14/914,946

(22) PCT Filed: Sep. 2, 2014

(86) PCT No.: PCT/JP2014/072978  
§ 371 (c)(1),  
(2) Date: Feb. 26, 2016

(87) PCT Pub. No.: WO2015/033899  
PCT Pub. Date: Mar. 12, 2015

(65) Prior Publication Data  
US 2016/0208037 A1   Jul. 21, 2016

(30) Foreign Application Priority Data  
Sep. 3, 2013   (JP) .................................. 2013-181742

(51) Int. Cl.
| | |
|---|---|
| C08F 12/00 | (2006.01) |
| C08F 261/06 | (2006.01) |
| C08F 216/14 | (2006.01) |
| C08F 2/42 | (2006.01) |
| C08F 8/30 | (2006.01) |
| D06M 15/347 | (2006.01) |
| C08F 116/14 | (2006.01) |
| C08F 216/12 | (2006.01) |
| D06M 101/32 | (2006.01) |

(52) U.S. Cl.  
CPC .............. *C08F 261/06* (2013.01); *C08F 2/42* (2013.01); *C08F 8/30* (2013.01); *C08F 116/14* (2013.01); *C08F 216/125* (2013.01); *C08F 216/1416* (2013.01); *D06M 15/347* (2013.01); *C08F 2800/10* (2013.01); *C08F 2800/20* (2013.01); *C08F 2810/50* (2013.01); *D06M 2101/32* (2013.01); *D06M 2200/11* (2013.01); *D06M 2200/12* (2013.01)

(58) Field of Classification Search  
CPC .... C08F 261/06; C08F 216/1416; C08F 2/42; C08F 8/30; C08F 2800/10; C08F 2800/20; C08F 2810/50; C06M 15/347; D06M 2101/32; D06M 2200/11; D06M 2200/12  
USPC ....................................................... 428/522  
See application file for complete search history.

(56) References Cited

U.S. PATENT DOCUMENTS

| 2012/0022219 A1 | 1/2012 | Yoshida |
| 2012/0172535 A1 | 7/2012 | Yoshida |

FOREIGN PATENT DOCUMENTS

| CN | 103242488 A | | 8/2013 |
| CN | 103347628 A | | 10/2013 |
| JP | 2005-154497 A | | 6/2005 |
| JP | 2005-154603 A | | 6/2005 |
| JP | 2005154602 A | * | 6/2005 |
| WO | 2010/109928 A1 | | 9/2010 |
| WO | 2011/018924 A1 | | 2/2011 |

(Continued)

OTHER PUBLICATIONS

V. Campbell et al. "Linear and Branched Fluoroazo-Benzene Chromophores with Increased Compatibility in Semifluorinated Polymers", Journal of Polymer Science: Part A: Polymer Chemistry 45: 3166-3177, 2007.*

(Continued)

*Primary Examiner* — Michael M Bernshteyn  
(74) *Attorney, Agent, or Firm* — Oblon, McClelland, Maier & Neustadt, L.L.P.

(57) ABSTRACT

A star-shaped vinyl ether polymer, comprising a central core and an arm portion bonded to the central core, wherein: the arm portion comprises a repeating unit derived from a vinyl ether monomer; the star-shaped vinyl ether polymer comprises a structure represented by the following Formula (1):

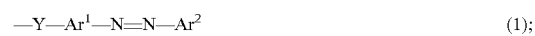

wherein Y represents an ether bond, a thioether bond, a group —NH—, or a group —OR$^1$—*, R$^1$ represents an alkylene group, * represents a position bonded to Ar$^1$ in Formula (I), Ar$^1$ represents a substituted or unsubstituted divalent aromatic hydrocarbon group, and Ar$^2$ represents a substituted or unsubstituted monovalent aromatic hydrocarbon group; and particularly the central core is formed by crosslinking of a polyfunctional coupling agent, wherein the polyfunctional coupling agent is a compound represented by the following Formula (3):

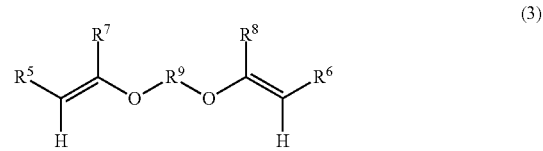

wherein R$^5$ to R$^8$ each independently represent a hydrogen atom or a methyl group, and R$^9$ represents a divalent organic group.

13 Claims, No Drawings

(56) References Cited

FOREIGN PATENT DOCUMENTS

| WO | 2011/070880 A1 | 6/2011 | |
|---|---|---|---|
| WO | 2013/099427 A1 | 7/2013 | |
| WO | WO 2013099427 A1 * | 7/2013 | ............ C08F 293/00 |
| WO | 2014/133117 A1 | 9/2014 | |

OTHER PUBLICATIONS

Yuya Tsuchida, "Development of Harmful Substance Trapping Polymer Material" North Eastern Industrial Research Center, (http://www.hik.shiga-irc.go.jp/kenkyu/ken_ako/kenk_nag/H17ken/report/H17_tsuchida.pdf), Total 14 Pages, (2005), (with Partial English Translation).

Victoria E. Campbell, et al., "Linear and Branched Fluoroazo-Benzene Chromophores with Increased Compatibility in Semifluorinated Polymers", Journal of Polymer Science Part A, vol. 45, No. 15, Total 14 Pages, (2007).

Tomohide Yoshida, et al., "Photosensitive Copolymers with Various Types of Azobenzene Side Groups Synthesized by Living Cationic Polymerization", J. Polym. Sci. Part A, vol. 43, No. 18, Total 8 Pages, (2005).

Tomohide Yoshida, et al., "Polymer Surface Modification Using Diblock Copolymers Containing Azobenzene", Journal of Polymer Science Part A, vol. 43, No. 22, Total 8 Pages, (2005).

Tomohide Yoshida, et al., "Synthesis of Block Copolymers With Azobenzene for Photo-Responsive and New Class of Surface Modification", Polymer Preprints, vol. 45, No. 2, Total 3 Pages, (2004).

Yuya Tsuchida, Heisei 18 Nendo Kenkyu Hokokusho, Total 7 Pages, (2007).

International Search Report dated Dec. 9, 2014 in PCT/JP14/072978 Filed Sep. 2, 2014.

Combined Office Action and Search Report dated Jan. 26, 2017 in Chinese Patent Application No. 201480045844.6 (with English translation of categories of cited documents).

* cited by examiner

STAR-SHAPED VINYL ETHER POLYMER

TECHNICAL FIELD

The present invention relates to a vinyl ether polymer as well as an agent for controlling hydrophilicity and hydrophobicity, a method for controlling hydrophilicity and hydrophobicity, and a polymer-substrate composite which uses the polymer.

BACKGROUND ART

Some polymer compounds exhibit a phenomenon of phase transition by responding to the external stimulus such as heat, pH, or light, and the development of a temperature sensor, a separation membrane, an adsorbent, a drug releasing agent, a water absorbent, a water retention agent, a humidity controlling agent, and an agent for indicator which apply the phase transition phenomenon has been actively carried out.

Among the polymer compounds as described above, compounds which exhibit a phase transition phenomenon by responding to heat are referred to as a temperature responsive polymer, and a living polymer of vinyl ether containing an oxyethylene chain is known as such a polymer. This living polymer exhibits hydrophilicity at a temperature equal to or lower than a specific temperature, and hydrophobicity at a temperature exceeding the specific temperature. Because it is an oily compound, the polymer is not equipped with moldability and film-forming properties, and thus the use thereof is greatly limited.

As a means for solving such a problem, the introduction of an azo group into a temperature responsive polymer has been investigated. For example, there has been an investigation as to imparting the temperature responsiveness associated with hydrophilicity and hydrophobicity to various general-purpose resin films by conducting the surface modification thereof using a diblock copolymer of vinyl ether containing an oxyethylene chain and vinyl ether containing an azobenzene structure (Patent Literature 1 and Non Patent Literature 1).

In addition, a specific star-shaped vinyl ether polymer having a polyvinyl ether chain as the arm portion is also regarded to exhibit temperature responsiveness (Patent Literature 2).

CITATION LIST

Patent Literature

Patent Literature 1: JP 2005-154603 A
Patent Literature 2: JP 2005-154497 A
Patent Literature 3: WO 2013/099427 A

Non Patent Literature

Non Patent Literature 1: TSUCHIDA Yuya, "Development of Harmful Substance Trapping Polymer Material", North Eastern Industrial Research Center of Shiga Prefecture Report 2005 (http://www.hik.shiga-irc.go.jp/kenkyu/ken_ako/kenk_nag/H17 ken/report/H17_tsuchida.pdf)

SUMMARY OF INVENTION

Technical Problem

However, it has been demonstrated by the investigation of the present inventors that the diblock copolymer or the star-shaped vinyl ether polymer having a polyvinyl ether chain as the arm portion described in Patent Literature 1 and Non Patent Literature 1 cannot impart temperature responsiveness to a fibrous substrate such as nonwoven fabric.

In view of such a background, the present applicants have found out that it is possible to impart the temperature responsiveness of hydrophilicity and hydrophobicity to a fibrous substrate by using a triblock copolymer of a vinyl ether containing an oxyethylene chain, a vinyl ether containing an azobenzene structure, and oxystyrene, and they have previously applied for a patent (Patent Literature 3).

Meanwhile, as the results of the investigation by the present inventors, it has been revealed that the triblock copolymer also exhibits insufficient temperature responsiveness in the case of being supported on a highly hydrophobic fibrous substrate in some cases.

Accordingly, an object of the invention is to provide a vinyl ether polymer which can exert temperature responsiveness even in the case of being supported on a highly hydrophobic fibrous substrate, an agent for controlling hydrophilicity and hydrophobicity containing the polymer, a method for controlling hydrophilicity and hydrophobicity using the polymer, and a polymer-substrate composite having the polymer supported on a substrate.

Solution to Problem

Hence, the present inventors have further carried out investigations to achieve the above object. As a result, it has been found out that a star-shaped vinyl ether polymer containing a specific structure derived from diaryl-diazene in the molecule can surprisingly exert temperature responsiveness even in the case of being supported on a highly hydrophobic fibrous substrate, whereby the invention has been completed.

That is, according to the present invention, there is provided a star-shaped vinyl ether polymer including a central core and an arm portion bonded to the central core, in which the arm portion includes a repeating unit derived from a vinyl ether monomer, and a structure represented by the following Formula (1) is included in the molecule:

$$—Y—Ar^1—N{=}N—Ar^2 \quad (1)$$

[in Formula (1), Y represents an ether bond, a thioether bond, a group —NH—, or a group —OR$^1$—* (R$^1$ represents an alkylene group, * represents a position bonded to Ar$^1$ in Formula (1)), Ar$^1$ represents a substituted or unsubstituted divalent aromatic hydrocarbon group, and Ar$^2$ represents a substituted or unsubstituted monovalent aromatic hydrocarbon group].

According to the present invention, there is provided an agent for controlling hydrophilicity and hydrophobicity including the star-shaped vinyl ether polymer.

Further, according to the present invention, there is provided a method for controlling hydrophilicity and the hydrophobicity using the star-shaped vinyl ether polymer.

Further, according to the present invention, there is provided a polymer-substrate composite including the star-shaped vinyl ether polymer supported on a substrate.

Advantageous Effects of Invention

The star-shaped vinyl ether polymer of the invention sufficiently exerts temperature responsiveness even in the case of being supported on a highly hydrophobic fibrous substrate and the hydrophilicity and the hydrophobicity are reversibly changed, and thus it can impart temperature responsiveness to a significantly wide range of substrates.

Therefore, according to the invention, it is possible to provide an agent for controlling hydrophilicity and hydrophobicity and a method for controlling hydrophilicity and hydrophobicity which can impart temperature responsiveness to a wide range of substrates including a highly hydrophobic fibrous substrate. In addition, the polymer-substrate composite of the invention has the temperature responsiveness.

DESCRIPTION OF EMBODIMENTS

The star-shaped vinyl ether polymer of the invention is the polymer that includes a central core and an arm portion bonded to the central core and in which the arm portion contains a repeating unit derived from a vinyl ether monomer and a structure represented by Formula (1) above is included in the molecule. Incidentally, a star-shaped vinyl ether polymer refers to a star polymer having a polymer chain which contains a repeating unit derived from a vinyl ether monomer, as the arm portion. In addition, the structure represented by Formula (1) above has an action of imparting penetrability to the substrate.

First, each of the symbols in Formula (1) above will be described.

In Formula (1) above, as Y, an ether bond (—O—) and a thioether bond (—S—) are preferable and an ether bond is more preferable.

In addition, the number of carbon atoms of the alkylene group represented by $R^1$ above is preferably from 1 to 10, more preferably from 1 to 6, even more preferably from 1 to 4, and particularly preferably from 1 to 2. In addition, the alkylene group may be branched or linear. Specific examples thereof may include a methylene group, an ethylene group, a propylene group, a trimethylene group, a tetramethylene group, a pentamethylene group, and a hexamethylene group.

In Formula (1), $Ar^1$ represents a substituted or unsubstituted divalent aromatic hydrocarbon group. Examples of the divalent aromatic hydrocarbon group may include a phenylene group, a naphthylene group, and an anthracylene group, and a phenylene group and a naphthylene group are preferable, and a phenylene group is particularly preferable, from the viewpoint of temperature responsiveness and penetrant diffusibility into the substrate. Incidentally, the bonding site of the divalent aromatic hydrocarbon group may be on any carbon of the aromatic ring.

In addition, examples of the substituent which the divalent aromatic hydrocarbon group may have may include an alkyl group having from 1 to 4 carbon atoms, a haloalkyl group having from 1 to 4 carbon atoms, an alkoxy group having from 1 to 4 carbon atoms, an alkoxyalkyl group having from 2 to 6 carbon atoms, a halogen atom, a carboxyl group, a nitro group, an amino group, a sulfo group, a sulfooxy group, and an aminosulfonyl group, and an alkyl group having from 1 to 4 carbon atoms is preferable.

Incidentally, the position and number of these substituents are arbitrary, and the substituents may be the same as or different from one another in a case in which the divalent aromatic hydrocarbon group has two or more substituents.

The number of carbon atoms of the alkyl group having from 1 to 4 carbon atoms is preferably 1 or 2. The alkyl group may be branched or linear, and examples thereof may include a methyl group, an ethyl group, a propyl group, an isopropyl group, a n-butyl group, a tert-butyl group, and an isobutyl group.

In addition, the haloalkyl group having from 1 to 4 carbon atoms means a linear or branched alkyl group having from 1 to 4 carbon atoms that is substituted with a halogen atom such as a chlorine atom, a bromine atom, or a fluorine atom, and the number and position of the halogen atom that is substituted are arbitrary. The number of carbon atoms of the haloalkyl group having from 1 to 4 carbon atoms is preferably 1 or 2, and a fluorine atom is preferable as the halogen atom. Examples of the haloalkyl group may include a trifluoromethyl group, a pentafluoroethyl group, and a 2,2,2-trifluoroethyl group.

In addition, the number of carbon atoms of the alkoxy group having from 1 to 4 carbon atoms is preferably 1 or 2. The alkoxy group may be branched or linear, and examples thereof may include a methoxy group, an ethoxy group, a n-propoxy group, an isopropoxy group, a n-butoxy group, a sec-butoxy group, a tert-butoxy group, and an isobutoxy group.

In addition, the number of carbon atoms of the alkoxyalkyl group having from 2 to 6 carbon atoms is preferably from 2 to 4. The alkoxyalkyl group may be branched or linear, and examples thereof may include a methoxymethyl group, an ethoxymethyl group, a 2-methoxyethyl group, and a 2-ethoxyethyl group.

In addition, examples of the halogen atom may include the same ones as the halogen atoms contained in the haloalkyl group.

In addition, suitable specific examples of $Ar^1$ may be represented by the following Formula (1-2) or (1-3),

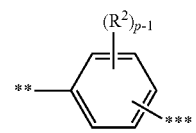

(1-2)

[in Formula (1-2), $R^2$ independently represents an alkyl group having 1 to 4 carbon atoms, a haloalkyl group having from 1 to 4 carbon atoms, an alkoxy group having from 1 to 4 carbon atoms, an alkoxyalkyl group having from 2 to 6 carbon atoms, a halogen atom, a carboxyl group, a nitro group, a sulfo group, a sulfooxy group, or an aminosulfonyl group,  represents the position bonded to Y in Formula (1), * represents the position bonded to nitrogen atom in Formula (1), and p-1 is an integer from 0 to 4.]

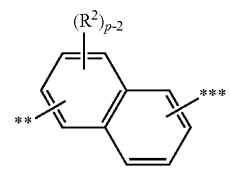

(1-3)

[in Formula (1-3), p-2 is an integer from 0 to 6, and $R^2$, , and * have the same meanings as described above], and compounds which are represented by Formula (1-2) above are preferable from the viewpoint of temperature responsiveness and penetrant diffusibility into the substrate.

In Formulas (1-2) and (1-3) above, specific examples of the respective groups represented by $R^2$ are the same as that of the substituent which the divalent aromatic hydrocarbon group may have.

In addition, p-1 in Formula (1-2) is preferably an integer from 0 to 2, and p-2 in Formula (1-3) is preferably an integer from 0 to 4.

In addition, in Formula (1), $Ar^2$ represents a substituted or unsubstituted monovalent aromatic hydrocarbon group. Examples of the monovalent aromatic hydrocarbon group may include a phenyl group, a naphthyl group, and an anthracenyl group, and a phenyl group and a naphthyl group are preferable and a phenyl group is particularly preferable from the viewpoint of temperature responsiveness and penetrant diffusibility into the substrate. Incidentally, the bonding site of the monovalent aromatic hydrocarbon group may be on any carbon of the aromatic ring.

In addition, the substituent which the monovalent aromatic hydrocarbon group may have is the same as that of the substituent which the divalent aromatic hydrocarbon group may have.

In addition, suitable specific examples of $Ar^2$ may be presented by the following Formula (1-4) or (1-5),

[in Formula (1-4), $R^3$ each independently represent an alkyl group having from 1 to 4 carbon atoms, a haloalkyl group having from 1 to 4 carbon atoms, an alkoxy group having from 1 to 4 carbon atoms, an alkoxyalkyl group having from 2 to 6 carbon atoms, a halogen atom, a carboxyl group, a nitro group, a sulfo group, a sulfooxy group, or an aminosulfonyl group, **** represents the position bonded to the nitrogen atom in Formula (1), and p-3 is an integer from 0 to 5.]

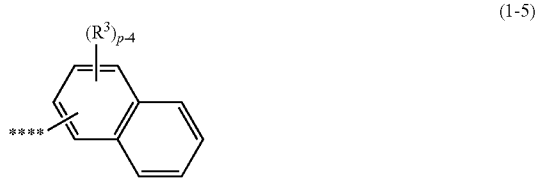

[in Formula (1-5), p-4 is an integer from 0 to 7, $R^3$ and **** have the same meanings as described above.], and groups which are represented by Formula (1-4) above are preferable from the viewpoint of temperature responsiveness and penetrant diffusibility into the substrate.

In Formulas (1-4) and (1-5) above, specific examples of the respective groups represented by $R^3$ are the same as that of the substituent which the divalent aromatic hydrocarbon group may have.

In addition, p-3 in Formula (1-4) is preferably an integer from 0 to 3, and p-4 in Formula (1-5) is preferably an integer from 0 to 5.

In addition, the structure represented by Formula (1) may be bonded to either of the central core or the arm portion, or may be bonded to both the central core and the arm portion. It is preferable that the structure is bonded to the central core. In the case of being bonded to the central core, the movement of the polymer chain that is linked to the central core as the arm portion is not limited, and it is also possible to firmly support the star-shaped polymer to the substrate surface by increasing the structure represented by Formula (1).

In addition, in a case in which the structure represented by Formula (1) is bonded to the arm portion, it is preferable that the structure represented by Formula (1) is bonded to the side chain or end of the polymer chain. In this case, it is preferable to introduce the structure into apart of the plural polymer chains. By virtue of this, the movement of the polymer chain is less likely to be limited, and the temperature responsiveness in the case of being supported on a substrate is likely to be exerted.

In addition, the content of the structure represented by Formula (1) is preferably from 1.5 to 100, more preferably from 2 to 50, and particularly preferably from 3 to 30 per one molecule of the star-shaped vinyl ether polymer of the invention from the viewpoint of temperature responsiveness and fixing ability onto the substrate surface.

In addition, the star-shaped vinyl ether polymer of the invention has a polymer chain containing a repeating unit derived from a vinyl ether monomer as the arm portion. As the repeating unit derived from a vinyl ether monomer, those which have a temperature responsive group are preferable, and from the viewpoint of temperature responsiveness and of improving the hydrophilicity when the temperature is equal to or lower than a predetermined temperature, those which are represented by the following Formula (2-1)

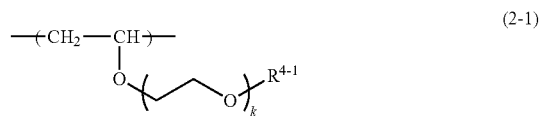

[in Formula (2-1), $R^{4-1}$ represents a methyl group, an ethyl group, or a carboxyphenyl group, and k is from 1 to 10 as an average value.]

or the following Formula (2-2):

[in Formula (2-2), $R^{4-2}$ represents an alkyl group having from 1 to 4 carbon atoms or a hydroxyalkyl group having from 1 to 4 carbon atoms.]

are more preferable, and those which are represented by the Formula (2-1) above are particularly preferable.

Incidentally, it is possible to adjust the critical temperature at which hydrophilicity and hydrophobicity change by appropriately changing the chain length in such a repeating unit or using two or more kinds of repeating units having different chain lengths.

In Formula (2-1) above, as $R^{4-1}$, a methyl group and an ethyl group are preferable from the viewpoint of temperature responsiveness and of improving the hydrophilicity when the temperature is equal to or lower than a predetermined temperature.

In addition, in Formula (2-1) above, k is from 1 to 10 as an average value, and preferably from 1 to 6 as an average value, more preferably from 1 to 4 as an average value, and particularly preferably from 1 to 3 as an average value.

In addition, in Formula (2-2) above, the alkyl chain of the alkyl group having from 1 to 4 carbon atoms and hydroxyalkyl group having from 1 to 4 carbon atoms which are represented by $R^{4-2}$ may be branched or linear. Specific examples of the alkyl chain are the same as that of the substituent which are exemplified as the substituent which the divalent aromatic hydrocarbon group may have.

In addition, the content of the repeating unit derived from a vinyl ether monomer is preferably from 50 to 100% by mole and more preferably from 70 to 100% by mole in the entire repeating units contained in the arm portion.

The central core of the star-shaped vinyl ether polymer of the invention is preferably formed by using a polyfunctional coupling agent, and more preferably formed by the cross-linking (polymerization) of a polyfunctional coupling agent.

As the polyfunctional coupling agent, a bifunctional coupling agent is preferable, and agents which are represented by the following Formula (3) are more preferable.

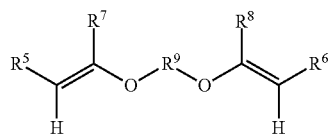

(3)

[in Formula (3), $R^5$ to $R^8$ each independently represent a hydrogen atom or a methyl group, and $R^9$ represents a divalent organic group.].

In Formula (3), $R^7$ and $R^8$ are preferably a hydrogen atom.

Examples of the divalent organic group represented by $R^9$ may include an alkylene group, a cycloalkylene group, an arylene group, and a divalent group in which two or more of these are linked to one another. Incidentally, these may have an oxygen atom between the carbon-carbon atoms. In addition, examples of the divalent group in which two or more are linked to one another may include an alkylene-arylene-alkylene group, an alkylene-cycloalkylene-alkylene group, and an alkylene-arylene-alkylene-arylene-alkylene group. Incidentally, the alkylene group may be branched or linear.

Suitable specific examples of the divalent organic group represented by $R^9$ may include a linear or branched alkylene group having from 1 to 30 carbon atoms (preferably from 2 to 25 and more preferably from 3 to 20) and a divalent organic group represented by the following Formula (3-2), (3-3), or (3-4).

$$—(R^{10}O)_{m-1}—R^{11}—$$ (3-2)

[in Formula (3-2), $R^{10}$ and $R^{11}$ each independently represent a linear or branched alkylene group having from 1 to 29 carbon atoms, and m-1 is from 1 to 29 as an average value.], $$—(R^{12}O)_{m-2}—R^{14}—(OR^{13})_{m-3}—$$ (3-3)

[in Formula (3-3), $R^{12}$ and $R^{13}$ each independently represent a linear or branched alkylene group having from 1 to 23 carbon atoms, $R^{14}$ represents an arylene group or an arylene-alkylene-arylene group, and m-2 and m-3 are each independently from 1 to 23 as an average value.], $$—R^{15}—R^{17}—R^{16}—$$ (3-4)

[in Formula (3-4), $R^{15}$ and $R^{16}$ each independently represent a linear or branched alkylene group having from 1 to 10 carbon atoms and $R^{17}$ represents a cycloalkylene group.].

The number of carbon atoms of $R^{10}$ to $R^{13}$ is preferably from 1 to 20, more preferably from 2 to 14, even more preferably from 2 to 6, and even more preferably from 2 to 4. Examples thereof may include an ethylene group, a propylene group, and a trimethylene group.

In addition, m-1 to m-3 are preferably from 1 to 20 as an average value, more preferably from 1 to 14 as an average value, even more preferably from 1 to 6 as an average value, and even more preferably 1.

In addition, examples of the arylene group represented by $R^{14}$ may include a phenylene group. In addition, as the arylene-alkylene-arylene group, a phenylene-$C_1$ to $C_6$ alkylene-phenylene group is preferable, and examples thereof may include a phenylene-dimethylmethylene-phenylene group.

In addition, the number of carbon atoms of the alkylene group represented by $R^{15}$ and $R^{16}$ is preferably from 1 to 6 and more preferably from 1 to 4. Specific examples thereof may include groups which are the same as the alkylene group represented by $R^1$.

In addition, the number of carbon atoms of the cycloalkylene group represented by $R^{17}$ is preferably from 3 to 7 and more preferably from 4 to 6. A suitable specific example is a cyclohexylene group.

Specific examples of the polyfunctional coupling agent may include ethylene glycol divinyl ether, bisphenol A bis(vinyloxyethylene)ether, bis(vinyloxyethylene)ether, hydroquinone-bis(vinyloxyethylene)ether, and 1,4-bis(vinyloxymethyl)cyclohexane.

In addition, the content of the structure derived from a polyfunctional coupling agent is preferably from 0.1 to 10 moles and more preferably from 0.3 to 5 moles with respect to 100 moles of the entire repeating units contained in the arm portion.

In addition, the weight average molecular weight (Mw) of the star-shaped vinyl ether polymer of the invention is preferably in a range of from 5000 to 200,000 and preferably in a range of from 10,000 to 175,000. Temperature responsiveness is improved by setting the weight average molecular weight (Mw) to 5000 or more, meanwhile, it is possible to improve the solubility in a solvent by setting it to 175,000 or less.

In addition, it is preferable that the star-shaped vinyl ether polymer of the invention is narrowly dispersed from the viewpoint of temperature responsiveness, and the molecular weight distribution (Mw/Mn) is preferably in a range of from 1.0 to 3.0 and more preferably in a range of from 1.0 to 2.5.

In addition, the absolute molecular weight (Mw absolute) of the star-shaped vinyl ether polymer of the invention is preferably in a range of from 5,000 to 400,000 and more preferably in a range of from 10,000 to 350,000.

In addition, the number of branches in the star-shaped vinyl ether polymer of the invention is preferably from 3 to 100 and more preferably from 3 to 50 in one molecule.

In addition, the particle size of the star-shaped vinyl ether polymer of the invention is preferably from 3 to 100 nm and more preferably from 5 to 50 nm.

The weight average molecular weight (Mw) or the molecular weight distribution (Mw/Mn), the absolute molecular weight (Mw absolute), the number of branches, and the particle size can be measured in accordance with the methods described in Examples to be described later.

Next, the method for producing the star-shaped vinyl ether polymer of the invention will be described.

The star-shaped vinyl ether polymer of the invention can be produced in accordance with a normal method, and it can be produced, for example, by (I) a method in which <I-1> a vinyl ether monomer containing a temperature responsive group (hereinafter, simply referred to as the "temperature responsive group") other than a structure represented by Formula (1) is polymerized with a vinyl ether monomer having a structure represented by Formula (1) through living cationic polymerization to synthesize an arm portion having a structure represented by Formula (1) in the side chain, subsequently, <I-2> a vinyl group is introduced into the side chain by adding a polyfunctional coupling agent thereto and a central core is formed by molecular crosslinking of the vinyl group;

(II) <II-1> a method in which a central core is formed using a polyfunctional coupling agent, subsequently, <II-2> a vinyl ether monomer containing a temperature responsive group and a vinyl ether monomer having a structure represented by Formula (1) are added thereto and polymerized through living cationic polymerization to form an arm portion having a structure represented by Formula (1) in the side chain;

(III) <III-1> a method in which a central core is formed using a polyfunctional coupling agent, subsequently, <III-2> a vinyl ether monomer containing a temperature responsive group is added thereto and polymerized through living cationic polymerization to form an arm portion, finally, <III-3> a structure represented by Formula (1) is introduced into the end of the polymer chain using a reaction terminator having a structure represented by Formula (1); or (IV) a method in which <IV-1> a vinyl ether monomer containing a temperature responsive group is polymerized through living cationic polymerization to synthesize an arms portion, subsequently, <IV-2>, a vinyl group is introduced into the side chain by adding a polyfunctional coupling agent thereto, a central core is formed by molecular crosslinking of the vinyl group, finally, <IV-3> a structure represented by Formula (1) is introduced into the central core using a reaction terminator having a structure represented by Formula (1).

Among these methods, the method of (IV) is particularly preferable from the viewpoint of introducing a structure represented by Formula (1) into the central core.

Incidentally, the living cationic polymerization is not accompanied by a side reaction of the chain transfer reaction, and thus it is possible to easily introduce a desired functional group. In addition, according to the living cationic polymerization, it is possible to control the molecular weight or the composition ratio and a narrowly dispersed polymer is obtained.

Examples of the vinyl ether monomer containing a temperature responsive group used in the methods of (I) to (IV) may include groups which are represented by the following Formula (4-1) or (4-2).

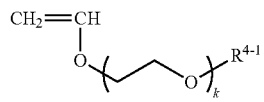

(4-1)

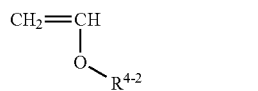

(4-2)

[in Formulas (4-1) and (4-2), the respective symbols have the same meanings as described above.]

Specific examples thereof may include 2-methoxyethyl vinyl ether, 2-ethoxyethyl vinyl ether, 2-(2-methoxyethoxy) ethyl vinyl ether, 2-(2-ethoxyethoxy)ethyl vinyl ether, 2-(2-(2-methoxyethoxy)ethoxy)ethyl vinyl ether, 2-(2-(2-ethoxyethoxy)ethoxy)ethyl vinyl ether, 2-(2-(2-methoxyethoxy)ethoxy)ethoxy)ethyl vinyl ether, 4-[2-(vinyloxy)ethoxy] benzoic acid, 4-(vinyloxy)-1-butanol, and isobutyl vinyl ether, and one kind may be used singly or two or more kinds may be used concurrently.

Among these, 2-methoxyethyl vinyl ether, 2-ethoxyethyl vinyl ether, 2-(2-ethoxyethoxy)ethyl vinyl ether, 2-(2-(2-methoxyethoxy)ethoxy)ethyl vinyl ether are preferable from the viewpoint of improving the hydrophilicity when it is at a temperature equal to or lower than a predetermined temperature.

In addition, examples of the vinyl ether monomer having a structure represented by Formula (1) used in the methods of (I) and (II) may be represented by the following Formula (5).

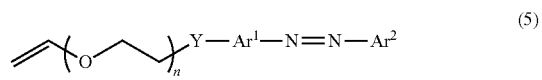

(5)

[in Formula (5), n is from 1 to 5 as an average value, and the other symbols have the same meanings as described above.]

Specific examples thereof may include phenyl(4-(2-vinyloxy-ethoxy)phenyl)diazene, o-tolyl(4-(2-vinyloxy-ethoxy) phenyl)diazene, (2-(trifluoromethyl)phenyl)(4-(2-vinyloxy-ethoxy)phenyl)diazene, (2-(methoxymethyl)phenyl)(4-(2-vinyloxy-ethoxy)phenyl)diazene, (2-chlorophenyl)(4-(2-vinyloxy-ethoxy)phenyl)diazene, 2-((4-(2-vinyloxy-ethoxy) phenyl)diazenyl)benzoic acid, 2-((4-(2-vinyloxy-ethoxy) phenyl)diazenyl)aniline, (2-nitrophenyl)(4-(2-vinyloxy-ethoxy)phenyl)diazene, and 2-((4-(2-vinyloxy-ethoxy) phenyl)diazenyl)benzenesulfonic acid, and one kind may be used singly or two or more kinds may be used concurrently.

Among these, phenyl(4-(2-vinyloxy-ethoxy)phenyl)diazene is preferable.

The used amount of the vinyl ether monomer having a structure represented by Formula (1) is usually about from 1 to 10 moles with respect to 100 moles of the vinyl ether monomer containing a temperature responsive group.

In addition, a reaction terminator having a structure represented by Formula (1) used in the methods of (III) and (IV) may be represented by the following Formula (6).

Z—Y—Ar¹—N═N—Ar² (6)

[in Formula (6), Z represents a hydrogen atom or an alkali metal atom, and the other symbols have the same meanings as described above.]

Examples of the alkali metal atom may include lithium and sodium.

Specific examples thereof may include 4-(phenyl-diazenyl)phenol, 2-(phenyl-diazenyl)phenol, 1-((2,4-dimethyl-phenyl)diazenyl)naphthalene-2-ol, 4-(phenyl-diazenyl)benzenethiol, 2-(phenyl-diazenyl)benzenethiol, 1-((2,4-dimethyl-phenyl)diazenyl)naphthalene-2-thiol, 4-(phenyl-diazenyl)aniline, 2-(phenyl-diazenyl)aniline, 1-((2,4-dimethyl-phenyl)diazenyl)naphthalene-2-amine, (4-(phenyl-diazenyl)phenyl)methanol, (2-(phenyl-diazenyl) phenyl)methanol, and (1-((2,4-dimethyl-phenyl)diazenyl) naphthalene-2-yl)methanol.

Among these, 4-(phenyl-diazenyl)phenol is particularly preferable from the viewpoint of reactivity and of being industrially easily available.

The used amount of the compound represented by Formula (6) is usually the same mole or more as that of the initiation seed, and preferably in a range of from 100 to 500 moles with respect to 100 moles of the initiation seed.

In addition, as the polyfunctional coupling agent used in the methods of (I) to (IV), the polyfunctional coupling agent described above may be used.

The used amount of the polyfunctional coupling agent is preferably from 100 to 1000 moles and more preferably from 200 to 800 moles with respect to 100 moles of the total amount of the initiation seed species from the viewpoint of securing the number of branches and suppressing gelation.

In addition, in the methods of (I) to (IV), it is preferable to conduct the respective polymerization reactions in the presence of an initiation seed, a Lewis acid, and a solvent.

Examples of the initiation seed to be used may include a compound for supplying cation such as an adduct of a vinyl ether with a compound which forms proton, in addition to a compound which produces proton such as water, an alcohol, and protonic acid or a compound which produces a carbocation such as an alkyl halide, and among these, a compound which produces a carbocation is preferable.

Examples of such a compound which produces a carbocation may include 1-alkoxyethyl acetate such as 1-isobutoxyethyl acetate.

The added amount of the initiation seed may be appropriately decided, depending on the molecular weight of the intended star-shaped polymer.

In addition, the Lewis acid may be any one of Leis acids that are generally used in the living cationic polymerization, and specifically, it is possible to suitably use an organic metal halide such as $Et_{1.5}AlCl_{1.5}$; and a metal halide such as $TiCl_4$, $TiBr_4$, $BCl_3$, $BF_3$, $BF_3 \cdot OEt_2$, $SnCl_2$, $SnCl_4$, $SbCl_5$, $SbF_5$, $WCl_6$, $TaCl_5$, $VCl_5$, $FeCl_3$, $ZnBr_2$, $ZnCl_4$, $AlCl_3$, or $AlBr_3$. Incidentally, the Lewis acid may be used singly or plural Lewis acids may be used concurrently.

Among such Lewis acids, an organic aluminum halide compound represented by the following Formula (7)

$$R^{18}_r AlX_s \qquad (7)$$

[in Formula (7), $R^{18}$ represents a monovalent organic group, X represents a halogen atom, and r and s represent numbers to be r+s=3, 0≤r<3, and 0<s≤3.]
or an aluminum halide compound is preferable.

In Formula (7), the monovalent organic group represented by $R^{18}$ is not particularly limited, and examples thereof may include an alkyl group (preferably having from 1 to 8 carbon atoms), an aryl group (preferably having from 6 to 12 carbon atoms), an aralkyl group (preferably having from 7 to 13 carbon atoms), an alkenyl group (preferably having from 2 to 8 carbon atoms), and an alkoxy group (preferably having from 1 to 8 carbon atoms).

In addition, examples of the halogen atom represented by X may include a chlorine atom, a bromine atom, and a fluorine atom, r is preferably in a range of from 1 to 2, and s is preferably in a range of from 1 to 2.

Specific examples of the Lewis acid as described above may include diethylaluminum chloride, diethylaluminum bromide, diisobutylaluminum chloride, methylaluminum sesquichloride, ethylaluminum sesquichloride, ethylaluminum sesquibromide, isobutylaluminum sesquichloride, methylaluminum dichloride, ethylaluminum dichloride, ethylaluminum dibromide, ethylaluminum difluoride, isobutylaluminum dichloride, octylaluminum dichloride, ethoxyaluminum dichloride, and phenylaluminum dichloride.

The amount of Lewis acid used is not particularly limited, and it may be set in consideration of the polymerization characteristics or polymerization concentration of the respective monomers to be used. Usually, the Lewis acid is used in a range of from 0.1 to 500 moles with respect to 100 moles of the total amount of the vinyl ether monomers.

Incidentally, in the living cationic polymerization, a Lewis base may be used as an inhibitor of a side reaction such as termination reaction. Specific examples thereof may include an ester compound such as ethyl acetate or n-butyl acetate.

In addition, examples of the solvent used in the respective methods may include an aromatic hydrocarbon-based solvent such as benzene, toluene, or xylene; an aliphatic hydrocarbon-based solvent such as propane, n-butane, iso-butane, n-pentane, n-hexane, n-heptane, n-octane, iso-octane, decane, hexadecane, or iso-pentane; a halogenated hydrocarbon-based solvent such as methylene chloride, ethylene chloride, or carbon tetrachloride; and an ether-based solvent such as tetrahydrofuran (THF), dioxane, diethyl ether, dibutyl ether, or ethylene glycol diethyl ether. These solvents may be used singly or in combination of two or more kinds thereof.

The reaction temperature for the living cationic polymerization is usually in a range of from −80° C. to 150° C., and preferably in a range of from −78° C. to 80° C. In addition, the reaction time is usually in a range of from 0.5 hour to 250 hours.

Incidentally, the step for forming central core by a polyfunctional coupling agent is preferably carried out until the crosslinking reaction sufficiently proceeds. The end point of the crosslinking reaction can be confirmed, for example, by monitoring the RI chart of GPC through time sharing and converging a change in GPC waveform.

Moreover, after the reaction is completed, a proton scavenger (basic compound) is added to the reaction system to trap the free proton generated, further the catalyst residue is removed, and the polymer is then purified and isolated, whereby a star-shaped vinyl ether polymer of the invention is obtained.

Incidentally, examples of the method for removing the catalyst residue may include a method in which the catalyst residue is treated with an aqueous solution containing an acid such as hydrochloric acid, nitric acid, or sulfuric acid or water; a method in which the catalyst residue is treated with an inorganic oxide such as silica gel, alumina, or silica-alumina; a method in which the catalyst residue is treated with an ion exchange resin.

In addition, examples of the method for isolating the polymer may include a method in which the volatile matter is distilled off from the polymer solution; a method in which a large amount of a poor solvent is added to precipitate the polymer and the precipitated polymer is separated; or a method in which these methods are combined.

Moreover, the star-shaped vinyl ether polymer of the invention obtained as described above sufficiently exerts temperature responsiveness even in the case of being supported on a fibrous substrate, particularly a highly hydrophobic fibrous substrate so as to reversibly change the hydrophilicity and the hydrophobicity, and thus it can impart temperature responsiveness to a significantly wide range of substrates.

Here, in the present specification, the temperature responsiveness refers to that it exerts hydrophilicity (water permeability) when it is at a temperature equal to or lower than a predetermined temperature while exerting hydrophobicity (water repellency) when it is at a temperature exceeding the predetermined temperature.

Hence, it is possible to control the hydrophilicity and hydrophobicity of the substrate to be applied by utilizing the temperature responsiveness as the star-shaped vinyl ether polymer of the invention is used, and it is possible to provide a polymer-substrate composite having the temperature responsiveness by supporting the star-shaped vinyl ether polymer of the invention on a substrate. Moreover, the agent for controlling hydrophilicity and hydrophobicity and polymer-substrate composite of the invention can be used, for example, as a material for a temperature sensor, a separation membrane, an adsorbent, a drug releasing agent, a water absorbent, a water retention agent, a humidity controlling agent, and an agent for indicator.

In addition, the agent for controlling hydrophilicity and hydrophobicity of the invention may contain a solvent in addition to the star-shaped vinyl ether polymer. Examples of such a solvent may include a lower alcohol (preferably having from 1 to 3 carbon atoms) such as methanol, ethanol, propanol, or isopropanol or water in addition to solvents which are exemplified as the solvent to be used in the polymerization reaction, and one kind may be contained singly or two or more kinds may be contained in combination.

The content of the star-shaped vinyl ether polymer is not particularly limited, and it is contained in the agent for controlling hydrophilicity and hydrophobicity at preferably from 1 to 50% by mass and more preferably from 5 to 25% by mass.

In addition, examples of the substrate to be the target for controlling hydrophilicity and hydrophobicity may include a resin, a vegetable fiber, an animal fiber, and an inorganic fiber. Examples of the resin may include a synthetic resin and a natural resin, a synthetic resin fiber is preferable as the synthetic resin, and natural resin fiber is preferable as the natural resin.

Examples of the synthetic resin may include a polyester-based resin such as polyethylene terephthalate, polytrimethylene terephthalate, polybutylene terephthalate, polyethylene naphthalate, or polybutylene naphthalate; a polystyrene-based resin such as polystyrene; a vinyl chloride-based resin; a polyolefin-based resin such as low density polyethylene, high density polyethylene, or polypropylene; a polyether-based resin such as polyether ketone or polyether ether ketone; a polyamide-based resin such as nylon or aramid; a polycarbonate resin such as polycarbonate; a polyimide resin such as polyimide; a polyurethane-based resin such as polyurethane; a fluororesin such as polytetrafluoroethylene; and a silicone resin such as polysiloxane, and examples of the natural resin may include latex and natural rubber. Incidentally, the substrate may be a composite material, an alloy, and a copolymer which are composed of a plurality of these resins. As the star-shaped vinyl ether polymer of the invention is used, temperature responsiveness is imparted to a highly hydrophobic fibrous substrate such as a fluororesin including polytetrafluoroethylene or a silicone resin including polysiloxane or a fibrous substrate that is coated with these hydrophobic resins.

In addition, examples of the vegetable fiber may include cotton, hemp, and linen, examples of the animal fiber may include wool, and silk, cashmere, and examples of the inorganic fiber may include a glass fiber. These fibers may be used singly or in combination, and these fibers may be used in combination with the synthetic resin or the natural resin.

In addition, the form of the substrate is not particularly limited, and examples thereof may include a bead, a film, a fibrous substrate, a sheet, a tube, a pipe, or a composite thereof, and a fibrous substrate is preferable and a fiber sheet is more preferable.

Examples of the form of the fiber sheet may include woven fabric, knitted fabric, and nonwoven fabric, and nonwoven fabric is preferable since the void between the fibers is small. As nonwoven fabric, it is possible to use nonwoven fabric and composite nonwoven fabric (for example, spun bond/melt blown nonwoven fabric and spun bond/melt blown/spun bond nonwoven fabric) which are produced by various production methods of nonwoven fabric such as an air through method, a heat roll method, a spun lace method, a needle punch method, a chemical bond method, an air laid method, a melt blown method, and a spun bond method. Incidentally, the fiber sheet may be a sheet made of a single layer or a sheet formed by laminating plural layers.

In addition, the star-shaped vinyl ether polymer of the invention can control the hydrophilicity and hydrophobicity of the substrate as described above, and it is particularly suitable for the control of the hydrophilicity and hydrophobicity of the surface of the resin since the star-shaped vinyl ether polymer contains an azo group having penetrability into the resin and can be immobilized onto the resin surface.

In addition, examples of the method for controlling hydrophilicity and hydrophobicity of the invention may include a method in which the star-shaped vinyl ether polymer of the invention is dissolved in the solvent described above and then coated on or impregnated into a substrate.

The method for coating or impregnation is not particularly limited, and examples thereof may include a method in which a solution containing the star-shaped vinyl ether polymer dissolved therein is coated using a spray, a roll, or a brush, and a dipping method.

In addition, in the polymer-substrate composite of the invention, the star-shaped vinyl ether polymer of the invention is supported on a substrate. The substrate may be the substrate described above, and a fibrous substrate such as a synthetic resin fiber, a natural resin fiber, a vegetable fiber, an animal fiber, or an inorganic fiber is preferable. In addition, the fibrous substrate is preferably a substrate composed of a resin fiber, examples of the kind or form of such a resin may include the same ones as those substrates described above. Among such resin fibers, a polyester fiber, a polyolefin fiber, a polyamide fiber, a composite fiber thereof, and fibers obtained by coating these with polytetrafluoroethylene are preferable.

Incidentally, as the polymer-substrate composite, a composite in which the star-shaped vinyl ether polymer is immobilized on the surface of the fiber constituting the fibrous substrate is preferable.

In addition, the polymer-substrate composite of the invention may contain, for example, a drug, or it may be one of which the fibrous substrate is subjected to a processing treatment. For example, it may be a composite to which functions such as flame retardance, antibacterial properties, deodorant properties, insect resistance, antifungal properties, and aromatic properties are imparted, or it may be joined and integrated with a sheet or film having these functions.

Incidentally, the production of the polymer-substrate composite of the invention may be conducted in the same manner as the method for controlling hydrophilicity and hydrophobicity described above. In addition, it is also possible to obtain the polymer-substrate composite by forming woven fabric, knitted fabric, and nonwoven fabric using a fiber having the star-shaped vinyl ether polymer immobilized onto the surface.

EXAMPLES

Hereinafter, the invention will be described in detail with reference to Examples. The invention is not limited to these Examples. Incidentally, the evaluation on the physical properties of the star-shaped polymer obtained in Examples was conducted by the following methods.

(1) Weight Average Molecular Weight (Mw) and Molecular Weight Distribution (Mw/Mn)

The weight average molecular weight and the molecular weight distribution were determined [column: 3 pieces of Shodex KF804L manufactured by SHOWA DENKO K.K.; eluent: tetrahydrofuran] from the standard polystyrene calibration curve by gel permeation chromatography (hereinafter, abbreviated as GPC) using a RI detector (manufactured by TOSOH CORPORATION).

(2) Absolute Molecular Weight (Mw Absolute)

The absolute molecular weight was determined by the GPC-light scattering-viscosity method [column: 2 pieces of Shodex KF-800D+KF-805L manufactured by SHOWA DENKO K.K.; eluent: tetrahydrofuran] using a triple detector (Viscotek TriSEC302TDA manufactured by Malvern Instruments Ltd., detector: refraction detector, viscosity detector, and light scattering detector).

(3) Number of Branches f of Star-Shaped Polymer

The number of branches (f) was determined in accordance with the following Equation.

$$f(\text{number of branches}) = [\text{weight fraction of arm-forming monomer}] \times [\text{Mw absolute (star)}]/[\text{Mw (branch)}]$$

(4) Particle Size

The particle size was analyzed [eluent tetrahydrofuran] by the dynamic light scattering (DLS) method using the Zetasizer Nano ZS manufactured by Malvern Instruments Ltd.

Example 1: Production (1) of methoxyethyl vinyl ether-core Star-Shaped Polymer having 4-(phenyl-diazenyl)phenoxy Group in Central Core (Hereinafter, Referred to as the "Temperature Responsive Polymer a")

A glass vessel equipped with a three-way stopcock was prepared, the inside of the vessel was purged with argon, and water adsorbed in the glass vessel was then removed by heating. In this vessel, 1.07 moles (hereinafter, abbreviated as M) (21.5 g) of 2-methoxyethyl vinyl ether (hereinafter, referred to as "MOVE"), 3.9 M (67 g) of ethyl acetate, 2.7 millimoles (hereinafter, abbreviated as mM) (83.2 mg) of 1-isobutoxyethyl acetate, and 89 mL of toluene were charged, the inside of the reaction system was cooled, a toluene solution (29 mM as $Et_{1.5}AlCl_{1.5}$) of $Et_{1.5}AlCl_{1.5}$ was added thereto when the temperature reached $-10°$ C., so as to initiate the polymerization.

A small amount of the reaction mixture was taken at the time point at which the conversion of MOVE was completed, methanol containing sodium methoxide was added to this to terminate the reaction, and the resultant was analyzed by GPC to obtain a result that the MOVE polymer thus obtained was a monodisperse polymer having Mw=29000 and Mw/Mn=1.26.

Subsequently, 5.3 mM (0.21 g) of 1,4-bis(vinyloxy)cyclohexane (hereinafter, referred to as "CHDVE") was added to the reaction system, a toluene solution (14 mM as $Et_{1.5}AlCl_{1.5}$) of $Et_{1.5}AlCl_{1.5}$ was added thereto, and the reaction was further continued at $-10°$ C.

The conversion of the vinyl group of CHDVE was monitored through time sharing using GPC, a small amount of reaction mixture was taken at the time point at which the GPC waveform became a predetermined waveform, methanol containing sodium methoxide was added to this to terminate the reaction, and the resultant was analyzed by GPC to obtain a result that the MOVE-core (CHDVE) star-shaped polymer thus obtained was a monodisperse polymer having Mw=47000 and Mw/Mn=1.48. In addition, it was confirmed that the peaks of the branches were completely disappeared from the GPC chart of this polymer.

Subsequently, an ethyl acetate solution (8.0 mM (0.31 g) as PDP) of 4-(phenyl-diazenyl)phenol (hereinafter, referred to as the "PDP") was added to the reaction system to terminate the polymerization reaction. Furthermore, methanol (1 M as sodium methoxide) containing sodium methoxide was added to the reaction system to trap free protons, thereby obtaining a temperature responsive polymer a.

Thereafter, aluminum oxide at 5% by mass was added to the solution in which the reaction was terminated, and the mixture was stirred for 2 hours. This solution was allowed to pass through Celite and a filter having a pore size of 1 µm and concentrated under reduced pressure using an evaporator, thereby purifying the temperature responsive polymer a. The temperature responsive polymer a after purification had Mw=47700 and Mw/Mn=1.54.

In addition, the absolute molecular weight of the polymer thus obtained was measured by GPC-LALLS to obtain Mw absolute=80800, and the number of branches and particle size of the polymer determined based on the absolute molecular weight were 3.4 and 7.0 nm, respectively.

It is apparent that the polymer thus obtained has a compact structure with a great number of branches from the fact that the usual weight average molecular weight is smaller as compared to the absolute molecular weight by GPC-LALLS. Furthermore, it is also apparent that the molecules are present without being assembled with one another from the analysis of particle size. Consequently, the polymer thus obtained is a star-shaped polymer.

Furthermore, a 0.2% by mass aqueous solution of the polymer thus obtained in ion-exchanged water was prepared, and allowed to pass through a filter having a pore size of 1 µm. The spectrum of this aqueous solution in the ultraviolet-visible region was measured, and the introduction of an azo group was confirmed from the fact that a spectrum having a maximum value at 350 nm was obtained.

Example 2: Production (2) of methoxyethyl vinyl ether-core Star-Shaped Polymer having 4-(phenyl-diazenyl)phenoxy Group in Central Core (Hereinafter, Referred to as the "Temperature Responsive Polymer b")

A glass vessel equipped with a three-way stopcock was prepared, the inside of the vessel was purged with argon, and water adsorbed in the glass vessel was then removed by heating. In this vessel, 1.06 M (21.5 g) of MOVE, 3.9 M (67 g) of ethyl acetate, 2.7 mM (83.2 mg) of 1-isobutoxyethyl acetate, and 89 mL of toluene were charged, the inside of the reaction system was cooled, a toluene solution (29 mM as $Et_{1.5}AlCl_{1.5}$) of $Et_{1.5}AlCl_{1.5}$ was added thereto when the temperature reached $-10°$ C., so as to initiate the polymerization.

A small amount of the reaction mixture was taken at the time point at which the conversion of MOVE was completed, methanol containing sodium methoxide was added to this to terminate the reaction, and the resultant was analyzed by GPC to obtain a result that the MOVE polymer thus obtained was a monodisperse polymer having Mw=31600 and Mw/Mn=1.21.

Subsequently, 26.5 mM (1.03 g) of CHDVE was added to the reaction system, a toluene solution (14 mM as $Et_{1.5}AlCl_{1.5}$) of $Et_{1.5}AlCl_{1.5}$ was added thereto, and the reaction was further continued at −10° C.

The conversion of the vinyl group of CHDVE was monitored through time sharing using GPC, a small amount of reaction mixture was taken at the time point at which the GPC waveform became a predetermined waveform, methanol containing sodium methoxide was added to this to terminate the reaction, and the resultant was analyzed by GPC to obtain a result that the MOVE-core (CHDVE) star-shaped polymer thus obtained was a monodisperse polymer having Mw=155000 and Mw/Mn=2.22. In addition, it was confirmed that the peaks of the branches were completely disappeared from the GPC chart of this polymer.

Subsequently, an ethyl acetate solution (8.0 mM (0.31 g) as PDP) of PDP was added to the reaction system to terminate the polymerization reaction. Furthermore, methanol (1 M as sodium methoxide) containing sodium methoxide was added to the reaction system to trap free protons, thereby obtaining a temperature responsive polymer b.

Thereafter, aluminum oxide at 5% by mass was added to the solution in which the reaction was terminated, and the mixture was stirred for 2 hours. This solution was allowed to pass through Celite and a filter having a pore size of 1 μm and concentrated under reduced pressure using an evaporator, thereby purifying the temperature responsive polymer b. The temperature responsive polymer b after purification had Mw=154100 and Mw/Mn=2.25.

Furthermore, a 0.2% by mass aqueous solution of the polymer thus obtained in ion-exchanged water was prepared, and allowed to pass through a filter having a pore size of 1 μm. The spectrum of this aqueous solution in the ultraviolet-visible region was measured, and the introduction of an azo group was confirmed from the fact that a spectrum having a maximum value at 350 nm was obtained.

Comparative Example 1: Production (1) of methoxyethyl vinyl ether-core Star-Shaped Polymer (Hereinafter, Referred to as the "Temperature Responsive Polymer c")

A glass vessel equipped with a three-way stopcock was prepared, the inside of the vessel was purged with argon, and water adsorbed in the glass vessel was then removed by heating. In this vessel, 1.07 M (21.5 g) of MOVE, 3.9 M (67 g) of ethyl acetate, 2.7 mM (83.2 mg) of 1-isobutoxyethyl acetate, and 89 mL of toluene were charged, the inside of the reaction system was cooled, a toluene solution (29 mM as $Et_{1.5}AlCl_{1.5}$) of $Et_{1.5}AlCl_{1.5}$ was added thereto when the temperature reached −10° C., so as to initiate the polymerization.

A small amount of the reaction mixture was taken at the time point at which the conversion of MOVE was completed, methanol containing sodium methoxide was added to this to terminate the reaction, and the resultant was analyzed by GPC to obtain a result that the MOVE polymer thus obtained was a monodisperse polymer having Mw=28000 and Mw/Mn=1.24.

Subsequently, 5.3 mM (0.21 g) of CHDVE was added to the reaction system, a toluene solution (14 mM as $Et_{1.5}AlCl_{1.5}$) of $Et_{1.5}AlCl_{1.5}$ was added thereto, and the reaction was further continued at −10° C.

The conversion of the vinyl group of CHDVE was monitored through time sharing using GPC, a small amount of reaction mixture was taken at the time point at which the GPC waveform became a predetermined waveform, methanol containing sodium methoxide was added to this to terminate the reaction, and the resultant was analyzed by GPC to obtain a result that the MOVE-core (CHDVE) star-shaped polymer thus obtained was a monodisperse polymer having Mw=47000 and Mw/Mn=1.48. In addition, it was confirmed that the peaks of the branches were completely disappeared from the GPC chart of this polymer.

Subsequently, methanol (5 M as sodium methoxide) containing sodium methoxide was added to the reaction system to trap free protons, thereby obtaining a temperature responsive polymer c.

Thereafter, aluminum oxide at 5% by mass was added to the solution in which the reaction was terminated, and the mixture was stirred for 2 hours. This solution was allowed to pass through Celite and a filter having a pore size of 1 μm and concentrated under reduced pressure using an evaporator, thereby purifying the temperature responsive polymer c. The temperature responsive polymer c after purification had Mw=48300 and Mw/Mn=1.57.

Comparative Example 2: Production of methoxyethyl vinyl ether-b-phenyl(4-(2-vinyloxyethoxy)phenyl)diazene-b-p-isopropenylphenol (Hereinafter, Referred to as the "Temperature Responsive Polymer d")

A glass vessel equipped with a three-way stopcock was prepared, the inside of the vessel was purged with argon, and water adsorbed in the glass vessel was then removed by heating. In this vessel, 0.71 M (32.6 g) of MOVE, 0.89 M (35.3 g) of ethyl acetate, 3.56 mM (0.25 g) of 1-isobutoxyethyl acetate, and 270 mL of toluene were charged, the inside of the reaction system was cooled, a toluene solution (13.2 mM as $Et_{1.5}AlCl_{1.5}$) of $Et_{1.5}AlCl_{1.5}$ was added thereto when the temperature reached, 0° C. so as to initiate the polymerization.

A small amount of the reaction mixture was taken at the time point at which the conversion of MOVE was completed, methanol containing sodium methoxide was added to this to terminate the reaction, and the MOVE polymer thus obtained was a monodisperse polymer having Mw=32800 and Mw/Mn=1.11.

Subsequently, a toluene solution (0.071 M (8.56 g) as PVEPD) of phenyl(4-(2-vinyloxyethoxy)phenyl)diazene (hereinafter, referred to as "PVEPD") was added to the reaction system, a toluene solution (20.2 mM as $Et_{1.5}AlCl_{1.5}$) of $Et_{1.5}AlCl_{1.5}$ was further added thereto, and the reaction was continued.

A small amount of the reaction mixture was taken at the time point at which the conversion of PVEPD was completed, methanol containing sodium methoxide was added to this to terminate the reaction, the MOVE-b-PVEPD polymer thus obtained was a monodisperse polymer having Mw=35400 and Mw/Mn=1.12. In addition, it was confirmed that the peak derived from the MOVE polymer was completely disappeared from the GPC chart of this polymer.

Subsequently, an ethyl acetate solution (7.13 mM (0.43 g) as PIPP) of p-isopropenylphenol (hereinafter, referred to as "PIPP") was added to the reaction system, a toluene solution (33.7 mM as $SnCl_4$) of $SnCl_4$ was further added thereto, and the reaction was continued.

Methanol (5 M as sodium methoxide) containing sodium methoxide was added to the reaction system to terminate the reaction at the time point at which the conversion of PIPP was completed, thereby obtaining a temperature responsive polymer d. The triblock polymer thus obtained was a monodisperse polymer having Mw=37300 and Mw/Mn=1.15.

Subsequently, aluminum oxide at 5% by mass was added to the solution in which the reaction was terminated, and the mixture was stirred for 2 hours. This solution was allowed to pass through Celite and a filter having a pore size of 1 μm and concentrated under reduced pressure using an evaporator, thereby purifying the temperature responsive polymer d. The temperature responsive polymer d after purification had Mw=38100 and Mw/Mn=1.18. Incidentally, the polymer composition of the temperature responsive polymer d is MOVE:PVEPD:PIPP=90:9:1 in a molar ratio.

Comparative Example 3: Production of methoxyethyl vinyl ether Polymer having 4-(phenyl-diazenyl)phenoxy Group at One End (Hereinafter, Referred to as the "Temperature Responsive Polymer e")

A glass vessel equipped with a three-way stopcock was prepared, the inside of the vessel was purged with argon, and water adsorbed in the glass vessel was then removed by heating. In this vessel, 1.52M (63.1 g) of MOVE, 0.95M (33.9 g) of ethyl acetate, 3.8 mM (0.25 g) of 1-isobutoxyethyl acetate, and 261 mL of toluene were charged, the inside of the reaction system was cooled, a toluene solution (14.2 mM as $Et_{1.5}AlCl_{1.5}$) of $Et_{1.5}AlCl_{1.5}$ was added thereto when the temperature reached 0° C., so as to initiate the polymerization.

A small amount of the reaction mixture was taken at the time point at which the conversion of MOVE was completed, methanol containing sodium methoxide was added to this to terminate the reaction, and the MOVE polymer thus obtained was a monodisperse polymer having Mw=20200 and Mw/Mn=1.38.

Subsequently, an ethyl acetate solution (11.4 mM as PDP (0.92 g)) of PDP was added to the reaction system to terminate the polymerization reaction. Furthermore, methanol (1 M as sodium methoxide) containing sodium methoxide was added to the reaction system to trap free protons.

Subsequently, aluminum oxide at 5% by mass was added to the solution in which the reaction was terminated, and the mixture was stirred for 2 hours. This solution was allowed to pass through Celite and a filter having a pore size of 1 μm and concentrated under reduced pressure using an evaporator, thereby purifying the temperature responsive polymer e. The temperature responsive polymer e after purification had Mw=20700 and Mw/Mn=1.39.

Examples 3 and 4 as Well as Comparative Examples 4 to 6: Production of Fiber Sheet A 10% by mass aqueous solution of each of the polymers a to e obtained in Examples 1 and 2 as well as Comparative Examples 1 to 3 in ion-exchanged water was prepared, and allowed to pass through a filter having a pore size of 1 μm. Polyethylene terephthalate nonwoven fabric coated with polytrifluoroethylene (3×10 cm) was immersed in this aqueous solution for one hour so that the polymer penetrated into the fabric, and the fabric was sufficiently washed, thereby obtaining a fiber sheet in which each of the polymers is supported. Stickiness derived from the polymer or uneven surface was not observed in all of the fiber sheets thus obtained so that the fiber sheets maintained the same form as the nonwoven fabric before being impregnated. The polymers which are supported on the respective fiber sheets are presented in Table 1.

Test Example 1: Evaluation Test for Water Permeability (1)

A water droplet of 100 μL was disposed on the surface of the fiber sheets obtained in Example 3 and 4 as well as Comparative Examples 4 to 6 at 15 points at equal intervals, and the number of water droplets after a lapse of 3 minutes under a humidity condition of 90% and temperature conditions of 25° and 70° C. was counted, whereby the water permeability and the temperature dependent change in water permeability were confirmed.

The evaluation results on water permeability of the respective fiber sheets are presented in Table 1. In addition, the results on the same evaluation for the nonwoven fabric which has not been subjected to the impregnation treatment are also presented in Table 1 for comparison.

TABLE 1

| | Impregnated polymer | Form of polymer | Bonding position of (1) | Evaluation results on water permeability (number of residual water droplets) | |
|---|---|---|---|---|---|
| | | | | 25° C. | 75° C. |
| Example 3 | a | Star-shaped polymer | Central core | 9 | 14 |
| Example 4 | b | Star-shaped polymer | Central core | 3 | 11 |
| Comparative Example 4 | c | Star-shaped polymer | Nil | 15 | 15 |
| Comparative Example 5 | d | Linear polymer | Side chain | 15 | 15 |
| Comparative Example 6 | e | Linear polymer | End | 15 | 15 |
| Untreated | Nil | — | — | 15 | 15 |

As presented in Table 1, the temperature responsive polymers c to e did not exert temperature responsiveness when being supported on a highly hydrophobic fibrous substrate.

On the contrary, the temperature responsive polymers a and b sufficiently exerted temperature responsiveness even when being supported on a highly hydrophobic fibrous substrate.

Test Example 2: Evaluation Test for Water Permeability (2)

The fiber sheets in which the respective polymers are supported (these are regarded as Example 5 as well as Comparative Examples 7 and 8, respectively) were obtained in the same manner as in Example 4 as well as Comparative Examples 4 and 6, except that the fibrous substrate was changed to polyethylene terephthalate nonwoven fabric (untreated with polytrifluoroethylene).

Thereafter, the water permeability of the respective fiber sheets was evaluated in the same manner as in Test Example 1. The results are presented in Table 2. In addition, the results on the same evaluation for the nonwoven fabric which has not been subjected to the impregnation treatment are also presented in Table 2 for comparison.

TABLE 2

| | Impregnated polymer | Form of polymer | Bonding position of (1) | Evaluation results on water permeability (number of residual water droplets) 25° C. | 75° C. |
|---|---|---|---|---|---|
| Example 5 | b | Star-shaped polymer | Central core | 0 | 10 |
| Comparative Example 7 | c | Star-shaped polymer | Nil | 15 | 15 |
| Comparative Example 8 | e | Linear polymer | End | 10 | 14 |
| Untreated | Nil | — | — | 15 | 15 |

As presented in Table 2, the temperature responsive polymer b exerted excellent temperature responsiveness when being supported on a fibrous substrate. From this result, it finds that the composite of the invention has the temperature responsiveness, and able to reversibly achieve hydrophilicity (water permeability) and hydrophobicity (water repellency) in response to the thermal stimulus.

In addition, the temperature responsive polymer c did not exert temperature responsiveness when being supported on a fibrous substrate.

The invention claimed is:

1. A star-shaped vinyl ether polymer, comprising a central core and an arm portion bonded to the central core, wherein:
   the arm portion comprises a repeating unit derived from a vinyl ether monomer;
   the star-shaped vinyl ether polymer comprises a structure represented by the following Formula (1):

—Y—Ar$^1$—N=N—Ar$^2$     (1);

wherein
   Y represents an ether bond, a thioether bond, a group —NH—, or a group —OR$^1$—*,
   R$^1$ represents an alkylene group,
   Ar$^1$ represents a position bonded to Ar$^1$ in Formula (1),
   Ar$^2$ represents a substituted or unsubstituted divalent aromatic hydrocarbon group, and
   Ar$^2$ represents a substituted or unsubstituted monovalent aromatic hydrocarbon group; and
   the central core is formed by crosslinking of a polyfunctional coupling agent, wherein the polyfunctional coupling agent is a compound represented by the following Formula (3):

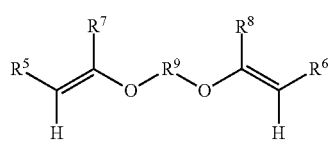
   (3)

wherein
   R$^5$ to R$^8$ each independently represent a hydrogen atom or a methyl group, and
   R$^9$ represents a divalent organic group.

2. The star-shaped vinyl ether polymer according to claim 1, wherein the structure represented by Formula (1) is bonded to the central core.

3. The star-shaped vinyl ether polymer according to claim 1, wherein the repeating unit derived from the vinyl ether monomer is represented by the following Formula (2-1):

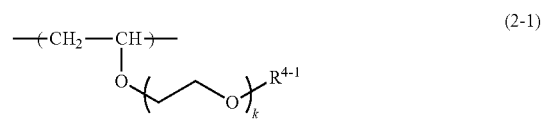
(2-1)

wherein R$^{4-1}$ represents a methyl group, an ethyl group, or a carboxyphenyl group, and k is from 1 to 10 as an average value, or
the following Formula (2-2):

(2-2)

wherein R$^{4-2}$ represents an alkyl group having from 1 to 4 carbon atoms or a hydroxyalkyl group having from 1 to 4 carbon atoms.

4. An agent for controlling hydrophilicity and hydrophobicity, the agent comprising the star-shaped vinyl ether polymer according to claim 1.

5. A method for controlling hydrophilicity and the hydrophobicity of a substance, the method comprising contacting the substance with the star-shaped vinyl ether polymer according to claim 1.

6. A polymer-substrate composite, comprising the star-shaped vinyl ether polymer according to claim 1 supported on a substrate.

7. The polymer-substrate composite according to claim 6, wherein the substrate is a fibrous substrate.

8. A method for controlling hydrophilicity and the hydrophobicity of a substance, the method comprising contacting the substance with the star-shaped vinyl ether polymer according to claim 3.

9. A polymer-substrate composite, comprising the star-shaped vinyl ether polymer according to claim 2 supported on a substrate.

10. A polymer-substrate composite, comprising the star-shaped vinyl ether polymer according to claim 3 supported on a substrate.

11. The star-shaped vinyl ether polymer according to claim 3, wherein the repeating unit derived from the vinyl ether monomer is represented by Formula (2-1).

12. The star-shaped vinyl ether polymer according to claim 3, wherein the repeating unit derived from the vinyl ether monomer is represented by Formula (2-2).

13. The star-shaped vinyl ether polymer according to claim 1, wherein in Formula (3), R$^7$ and R$^8$ are each a hydrogen atom.

* * * * *

UNITED STATES PATENT AND TRADEMARK OFFICE
CERTIFICATE OF CORRECTION

| | |
|---|---|
| PATENT NO. | : 9,908,960 B2 |
| APPLICATION NO. | : 14/914946 |
| DATED | : March 6, 2018 |
| INVENTOR(S) | : Norihiro Yoshida |

It is certified that error appears in the above-identified patent and that said Letters Patent is hereby corrected as shown below:

In the Claims

Column 21, Lines 39-41, "$Ar^1$ represents a position bonded to $Ar^1$ in Formula (1), $Ar^2$ represents a substituted or unsubstituted divalent aromatic hydrocarbon group, and" should read --* represents a position bonded to $Ar^1$ in Formula (1), $Ar^1$ represents a substituted or unsubstituted divalent aromatic hydrocarbon group, and--

Signed and Sealed this
Sixteenth Day of April, 2019

Andrei Iancu
*Director of the United States Patent and Trademark Office*